(12) United States Patent
Kwak et al.

(10) Patent No.: US 7,751,935 B2
(45) Date of Patent: Jul. 6, 2010

(54) METHOD AND APPARATUS FOR CONTROLLING VIBRATION USING ACCELEROMETER

(75) Inventors: Joo-young Kwak, Seoul (KR); Yong-kwun Lee, Gyeonggi-do (KR); Young Son, Gyeonggi-do (KR); Chang-hyun Roh, Seoul (KR)

(73) Assignee: Samsung Electronic Co., Ltd., Gyeonggi-do (KR)

( * ) Notice: Subject to any disclaimer, the term of this patent is extended or adjusted under 35 U.S.C. 154(b) by 1378 days.

(21) Appl. No.: 11/000,426

(22) Filed: Dec. 1, 2004

(65) Prior Publication Data

US 2005/0187669 A1 Aug. 25, 2005

(30) Foreign Application Priority Data

Feb. 11, 2004 (KR) .................. 10-2004-0008936

(51) Int. Cl.
*G06F 19/00* (2006.01)

(52) U.S. Cl. .................. 700/245; 318/568.18

(58) Field of Classification Search .................. 701/37; 700/245, 260, 261; 318/568.18
See application file for complete search history.

(56) References Cited

U.S. PATENT DOCUMENTS

| 5,023,533 | A | * | 6/1991 | Ishikawa et al. | ............ 700/260 |
|---|---|---|---|---|---|
| 5,331,264 | A | * | 7/1994 | Cheng et al. | ............ 318/568.11 |
| 5,814,959 | A | * | 9/1998 | Nonaka et al. | ......... 318/568.11 |
| 5,908,122 | A | * | 6/1999 | Robinett et al. | ............. 212/275 |
| 6,026,338 | A | * | 2/2000 | Borschert et al. | ............. 701/37 |
| 6,084,374 | A | * | 7/2000 | Nakatsuka et al. | ..... 318/568.18 |
| 6,084,375 | A | * | 7/2000 | Irwin et al. | ................. 318/569 |
| 7,102,315 | B2 | * | 9/2006 | Nakata et al. | .......... 318/568.22 |
| 2001/0048282 | A1 | * | 12/2001 | Forster et al. | ............... 318/569 |
| 2002/0099475 | A1 | * | 7/2002 | Spangler et al. | ............. 700/280 |
| 2004/0128030 | A1 | * | 7/2004 | Nagata et al. | ............. 700/245 |
| 2005/0038560 | A1 | * | 2/2005 | Nagasaka | .................... 700/245 |
| 2006/0206284 | A1 | * | 9/2006 | Hirabayashi | ................ 702/141 |

FOREIGN PATENT DOCUMENTS

| EP | 0604666 A1 | * | 7/1994 |
|---|---|---|---|
| JP | 62-233811 | | 10/1987 |
| JP | 04-025386 | | 1/1992 |
| JP | 10-010085 | | 1/1998 |
| JP | 2003-071767 | | 3/2003 |
| JP | 2003-245881 | | 9/2003 |
| WO | WO 2004/041484 | * | 5/2004 |

OTHER PUBLICATIONS

Chinese Office Action dated Aug. 22, 2008 with English translation of same and English Abstract of JP 2003-245881.
Office Action dated Aug. 6, 2009 for corresponding Japanese Application No. 2005-031816.

* cited by examiner

*Primary Examiner*—Mark Hellner
(74) *Attorney, Agent, or Firm*—Harness, Dickey & Pierce, P.L.C.

(57) ABSTRACT

A method of controlling vibration of a moving system having driving and driven units includes measuring an acceleration of the driven unit, generating a nominal acceleration by subtracting gravity from the measured acceleration, generating a control driving force according to the nominal acceleration, the driving force having a direction opposite to that of the measured acceleration, and applying the control driving force to the driven unit.

21 Claims, 6 Drawing Sheets
(1 of 6 Drawing Sheet(s) Filed in Color)

METHOD AND APPARATUS FOR CONTROLLING VIBRATION USING ACCELEROMETER

BACKGROUND OF THE INVENTION

Priority is claimed to Korean Patent Application No. 2004-8936, filed on Feb. 11, 2004, in the Korean Intellectual Property Office, the disclosure of which is incorporated herein in its entirety by reference.

1. Field of the Invention

The present invention relates to a method and apparatus for controlling vibration using an accelerometer and, more particularly, to a method and apparatus for controlling in a moving system such as a robot.

2. Description of the Related Art

In recent years, moving systems having a driving unit generating a torque (a driving force) and a driving unit driven by the torque transmitted from the driving unit have been used for many applications in robotics, automotive engineering, etc. Particularly, for a moving system relating to a vertical multi-joint robot, a position error caused by vibration is a major factor affecting the performance of the moving system. That is, when a driven unit of the multi-joint robot moves by a torque of a driving unit, an inertia force caused by the movement of the driven unit generates a vibration. Vibration causes the driven unit to be mis-positioned. Therefore, since multi-joint robots are widely used in applications that require an accurate position control, vibration control becomes very important.

One of the conventional methods for vibration control is to increase the stiffness of the moving system. For this, components of the moving system are formed of high stiffness materials or the connection structures between the components of the moving system are made rigid.

However, high stiffness materials increase manufacturing costs. In addition, since the high stiffness materials are heavy, energy consumption is increased. Also, when the high stiffness materials are used, manufacturing tolerances should be strictly controlled, thereby requiring a superior precision control system. Furthermore, since the conventional vibration control method is designed considering an initial design, it is difficult to actively control the vibration generated by the driven unit during actual operation.

Particularly, in the case of a two-leg robot, since the system is driven without any fixed base, a low-frequency vibration generated by a mass of the moving system becomes a major cause of an error. When the low-frequency vibration is controlled using the above-described conventional method, the size of the robot is remarkably increased, making it difficult for the robot to smoothly walk.

SUMMARY OF THE INVENTION

The present invention provides a vibration control method that can actively control an actual vibration of a moving system at less expense.

According to an aspect of the present invention, there is provided a method of controlling vibration of a moving system having driving unit and driven units, the method comprising: measuring an acceleration of the driven unit; generating an actual nominal acceleration by subtracting gravity from the measured acceleration; generating a control driving force based on the actual acceleration, the driving force having a direction opposite to that of the measured acceleration; and applying the control driving force to the driven unit.

According to another aspect of the present invention, there is provided a robot joint system controlled by the method defined above.

According to still another aspect of the present invention, there is provided an apparatus for controlling vibration of a driven unit moving by a driving force, including: an acceleration measuring unit for measuring an acceleration of the driven unit; a nominal acceleration generating unit for generating an actual acceleration by eliminating gravity from the measured acceleration; and a driving unit for generating a control driving force based on the nominal acceleration, the control driving force having a direction opposite to that of the measured acceleration.

According to still another aspect of the present invention, there is provided a joint driving system of a robot, including: a driving unit generating a driving force; a driven unit moving by the driving force; an acceleration measuring unit measuring an acceleration of the driven unit; and a nominal acceleration generating unit generating a nominal acceleration by eliminating gravity from the measured acceleration, wherein the driving unit generates the driving force by setting a control driving force generated according to the nominal acceleration to a desirable design driving force.

According to still yet another aspect of the present invention, there is provided a record medium storing a program for performing the method defined above in a computer.

BRIEF DESCRIPTION OF THE DRAWINGS

The application file contains at least one drawing executed in color. Copies of this color drawing is enclosed.

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
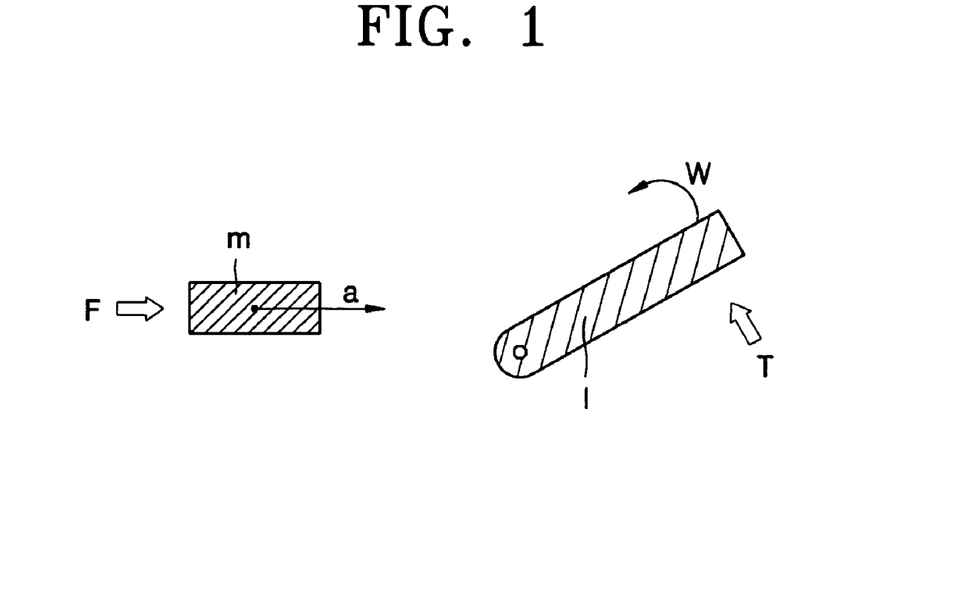
FIG. 1 is a view illustrating a vibration generating principle of a moving system.

FIG. 1 illustrates a vibration generating principle of a moving system.

A moving system is designed to move an object having a mass. The movement of the object can be divided into a linear motion and a rotational motion. Left and right views of FIG. 1 show the linear and rotational motions of the object, respectively.

In the linear motion shown in the left view of FIG. 1, reference characters F, m, and a indicate a driving force generated by a driving unit, a mass of a driven unit, and acceleration of the driven unit, respectively. That is, when the driven unit receives the driving force F, the driven unit moves with acceleration a. When the driving force is not applied any more, the driven unit tends to continuously move in a moving direction by inertia. However, a geometrically fixed structure of the moving system acts force in a second direction opposite to the inertia. As a result, the driven unit receives a force in the second direction, thereby vibrating in a direction parallel with the second direction where it has moved.

In the rotational motion shown in the right view of FIG. 1, reference characters T, w, and l indicate a torque corresponding to the driving force F, an angular acceleration corresponding to the acceleration a, and an inertia mass moment corresponding to the mass m, respectively. A rectangular coordinate system is used for the following description of the moving system.

Figure 2:
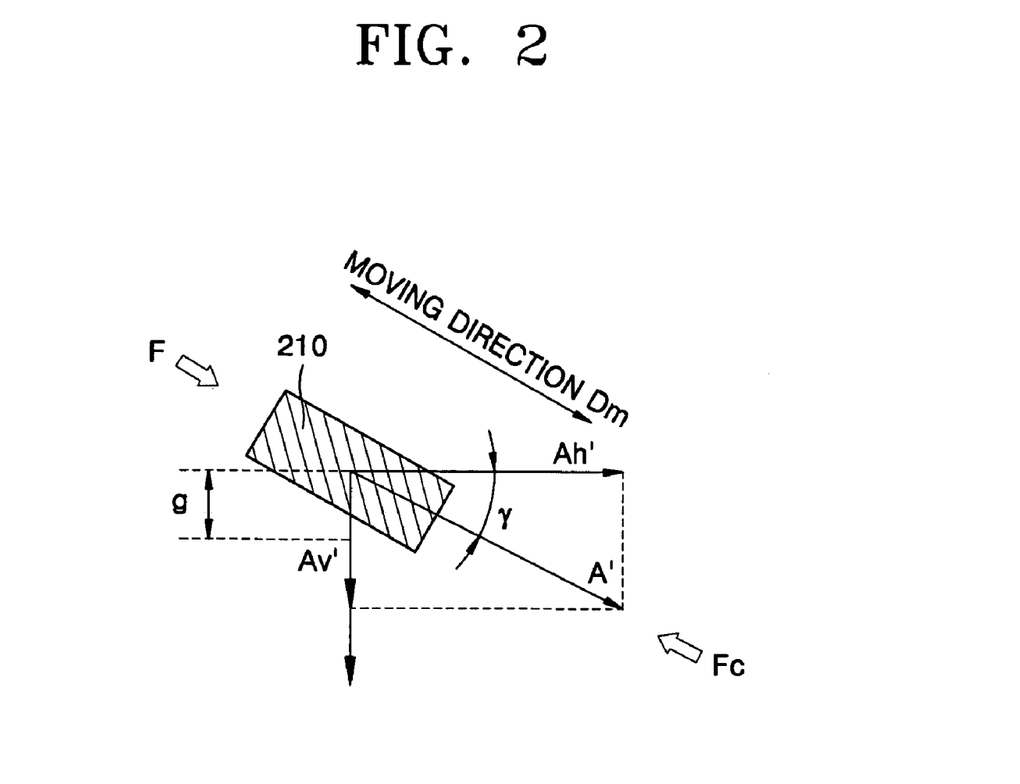
FIG. 2 is a view illustrating a principle of a vibration control method according to the present invention.

FIG. 2 illustrates a principle of a vibration control method according to the present invention.

A driven unit receives a driving force F to move in a direction DM. At this point, an acceleration A' is generated. As the driven unit has mass m, it is affected by gravity g. The acceleration A' is divided into a vertical component A'v and a horizontal component A'h. At this point, the vertical component A'v is identical to the gravity g. The acceleration A' is a value measured by an accelerometer.

Referring again to FIG. 1, when the driving force F is not applied any more, if the driving unit can apply a driving force F2, which is identical in intensity but opposite in a direction to the inertia force F1, to the driven unit, the vibration of the driven unit can be compensated. That is, after the acceleration a is measured, if the driving unit generates the driving force F2 and applies the same to the driven unit, the vibration can be suppressed. The present invention has been made in accordance with this principle, among others.

Referring again to FIG. 2, an advancing direction of the driven unit is not perpendicular to the gravity while an advancing direction of the driven unit is perpendicular to the gravity in FIG. 1. Therefore, in order to use the vibration control method using the acceleration, which has used for the moving system depicted in FIG. 1, for the moving system depicted in FIG. 2, a correction is required because an influence of the gravity g on the measured acceleration A' must be considered.

In FIG. 2, the acceleration A' generated by the driving force F is the acceleration measured at a location to which the driven unit actually moves. The measured acceleration A' can be divided into the measured vertical component A'v and the measured horizontal component A'h. The measured vertical and horizontal components Av' and Ah' according to the geometrical structure depicted in FIG. 2 can be calculated according to the following equation 1.

$$A'v = A' \sin \gamma$$
$$A'h = A' \cos \gamma \quad \text{[Equation 1]}$$

where, γ is a horizontal difference angle.

Meanwhile, since the measured vertical component A'v is determined by adding the gravity g to a nominal vertical component Av, the gravity should be subtracted from the measured vertical component A'v to calculate the nominal vertical component Av. This can be represented by the following equation 2.

$$Av = A'v - g$$
$$Ah = A'h \quad \text{[Equation 2]}$$

In order to control the vibration, a control driving force Fc determined according to the nominal acceleration should be applied to the driven unit. Here, the control driving force Fc has a direction opposite to a direction of a driving force applied from the driving unit to the driven unit to suppress the vibration generated when the movement of the driven unit is stopped. The driving force Fc can be represented by the following equation 3.

$$Fc = -m \times Ac \quad \text{[Equation 3]}$$

where Ac is a control acceleration (Ac becomes $Ac = \sqrt{Av^2 + Ah^2}$ in the dynamic relationship of FIG. 2) and "−" shows that the direction of the control driving force is opposite to that of the driving force F.

Accordingly, the control driving force can be determined from the equations 1 through 3. The vibration can be suppressed by applying the determined control driving force.

Figure 3:
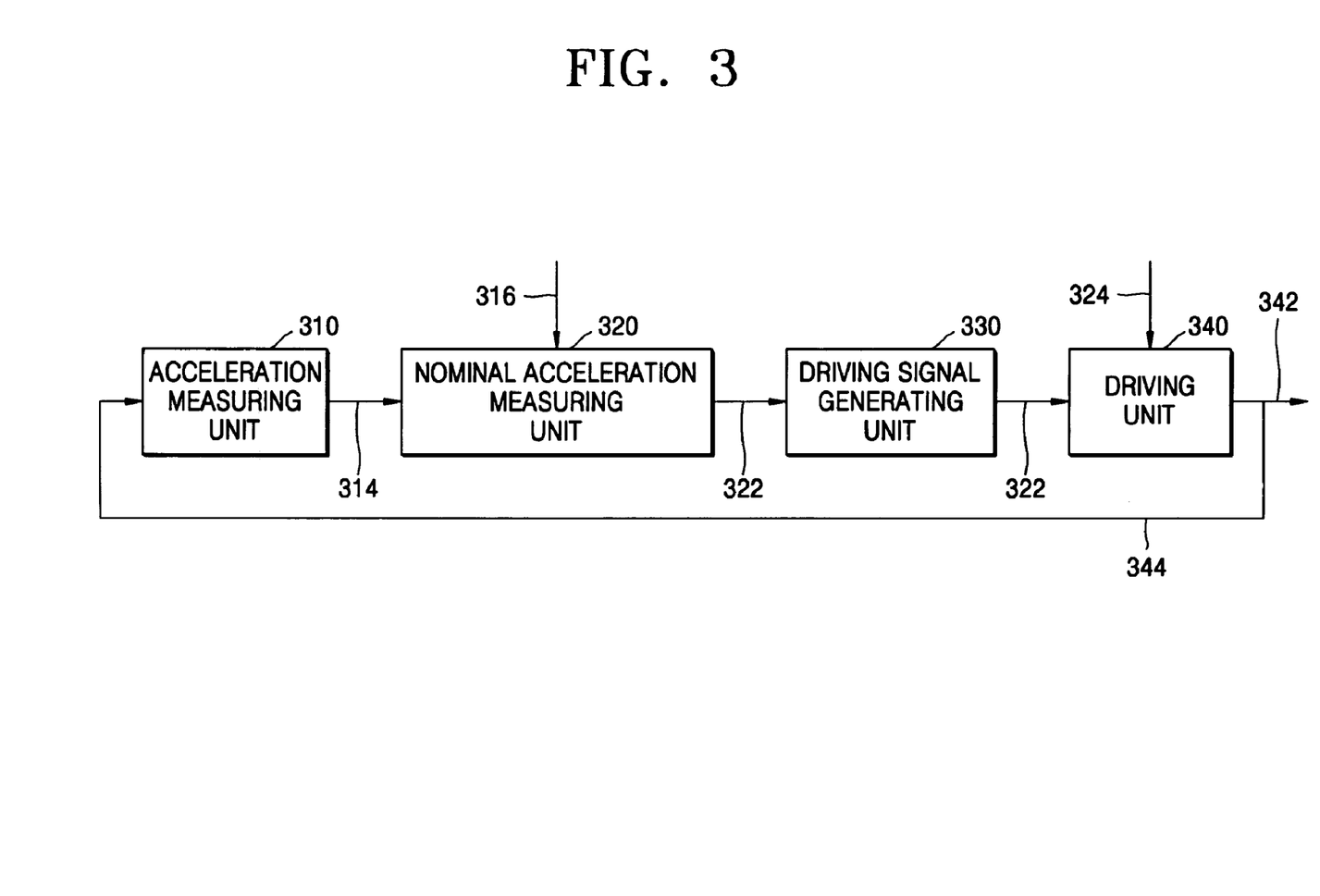
FIG. 3 is a view of a vibration control apparatus according to an embodiment of the present invention.

FIG. 3 shows a vibration control apparatus according to an embodiment of the present invention.

The vibration control apparatus comprises an acceleration measuring unit 310, a nominal acceleration generating unit 320, a driving signal generating unit 330, and a driving unit 340. The vibration control apparatus depicted in FIG. 3 is designed to control vibration in a predetermined direction.

The acceleration measuring unit 310 measures the acceleration in a direction where the driven unit is driven. The acceleration measuring unit 310 may be formed of a one-way or multi-way acceleration sensor. The measured acceleration A' (314) has an amplitude and a direction, and is divided into the horizontal and vertical components Ah' and Av'.

The nominal acceleration generation unit 320 generates the nominal acceleration A (322) according to the measured acceleration A' (314) with respect to a moving direction and the horizontal difference angle γ (316) with respect to the moving direction.

The horizontal difference angle γ (316) is an angle between the measured acceleration A' and the horizontal measured acceleration. Generally, a position control system contains mechanical information of all of the driven units, and the horizontal difference angle γ (316) can be easily determined from the mechanical information of the driven unit with respect to movement in a predetermined direction.

As described above, the nominal acceleration A (322) can be determined via equations 1 and 2 from the measured acceleration A' (314) and the horizontal difference angle γ (316). Since the nominal acceleration A (322) has the amplitude and direction, it can be divided into the vertical and horizontal components Av and Ah.

The driving signal generating unit 330 generates a driving signal 332 according to the nominal acceleration A (322) and driving acceleration 324. The driving acceleration 324 is a design acceleration. That is, the driving signal generating unit 330 compares the nominal acceleration A (322) with the driving acceleration 324 and generates the driving signal 332 when the nominal acceleration A(322) is less than or equal to the driving acceleration 324.

The driving signal 332 allows the driving unit 340 to generate a predetermined driving force 342. Accordingly, the driving signal contains information on the driving force. At this point, the driving force is determined by equation 2. A direction of the driving force is opposite to that of the driving force generating the measured acceleration 314.

When the vibration is in an allowable range, it may not be efficient to control the vibration. Therefore, the driving signal generating unit 330 may be designed such that, when the nominal acceleration 322 is in a predetermined range, the driving signal is not generated. In this embodiment, the driving signal generating unit 330 is designed to generate the driving signal 322 only when the nominal acceleration 322 is less than a lower critical value and greater than an upper critical value. For example, when the driving accelerating of the moving system is 5 m/s$^2$, the allowable range is between 4 and 6 m/s$^2$, and when the nominal acceleration 322 is equal to 4.5 or 5.5 m/s$^2$, the driving signal is not generated.

The driving unit 340 receives the driving signal 332, generates the driving force 342 corresponding to the magnitude and direction of the driving force contained in the driving signal 332, and applies the driving force 342 to the driven unit. By the driving force 342, the driven unit moves and generates a new measured acceleration 314 and the above-described process is repeated.

Figure 4:
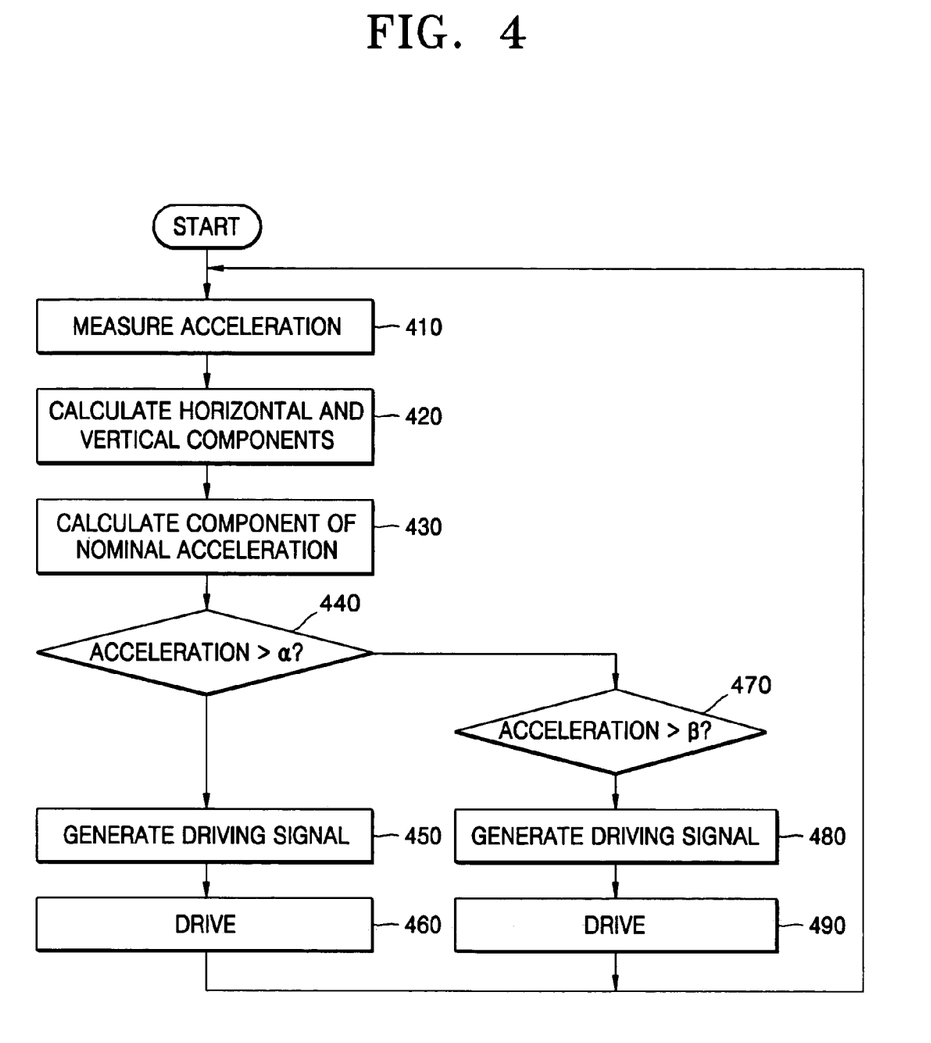
FIG. 4 is a flowchart illustrating a process for controlling vibration according to an embodiment of the present invention.

FIG. 4 shows a flowchart illustrating a vibration control method according to an embodiment of the present invention.

In operation 410, the acceleration of the driven unit in a predetermined direction is first measured.

In operation 420, the vertical and horizontal components of the measured acceleration are extracted according to the horizontal difference angle. For example, the vertical and horizontal components can be generated according to the equation 1. In this case, the horizontal difference angle can be easily extracted from the mechanical information of the moving system.

In operation 430, the gravity is subtracted from the horizontal and vertical components of the measured acceleration to extract the horizontal and vertical components of the nominal acceleration. This is performed by the equation 2. That is, the horizontal component of the nominal acceleration is the horizontal component of the measured acceleration, and the vertical component of the nominal acceleration is the vertical component from which the gravity is subtracted.

In operation 440, it is determined if the nominal acceleration is greater than an allowable upper limit value α. The allowable upper limit value is preset by a user.

In operation 450, when it is determined that the nominal acceleration is greater than the allowable upper limit value α, the driving signal generating unit 330 generates a driving signal and transmits the same to the driving unit 340. The driving signal has information on the intensity of the control driving force and direction. The information is generated by the driving signal generating unit 330 according to the equation 3. The magnitude of the driving force is determined according to the value of the nominal acceleration, and the direction thereof is opposite to that of the measured acceleration.

In operation 460, the driving unit 340 receives the driving signal 332, generates control driving force in response to the driving signal 332, and applies the driving force to the driven unit.

When it is determined in Step 440 that the operation acceleration is less than the allowable upper limit value α, operation 470 is performed.

In operation 470, it is determined if the nominal acceleration is less than an allowable lower limit value β. The allowable lower limit value is also preset by the user.

When it is determined in operation 470 that the nominal acceleration is less than the allowable lower limit value β, the driving signal generating unit 330 generates a driving signal in operation 480.

In operation 490, the driving unit 340 receives the driving signal 332, generates a control driving force in response to the driving signal 332, and applies the driving force to the driven unit.

Operations 440 through 490 are required when the user presets an allowable range with respect to the nominal acceleration. Steps 440 through 490 are performed by the driving signal generating unit 330, allowing the user to determine the generation of the driving signal.

When the user does not preset the allowable range with respect to the nominal acceleration and wishes to have the actual acceleration of the driven unit, which is identical to the design acceleration, Steps 440 through 490 are not required. That is, the driving signal generating unit 300 determines if the driving acceleration is identical to the nominal acceleration and generates the driving signal only when they are not identical to each other. However, in this case, since the unnecessary control driving force is frequently generated, the control efficiency is deteriorated.

Figure 5:
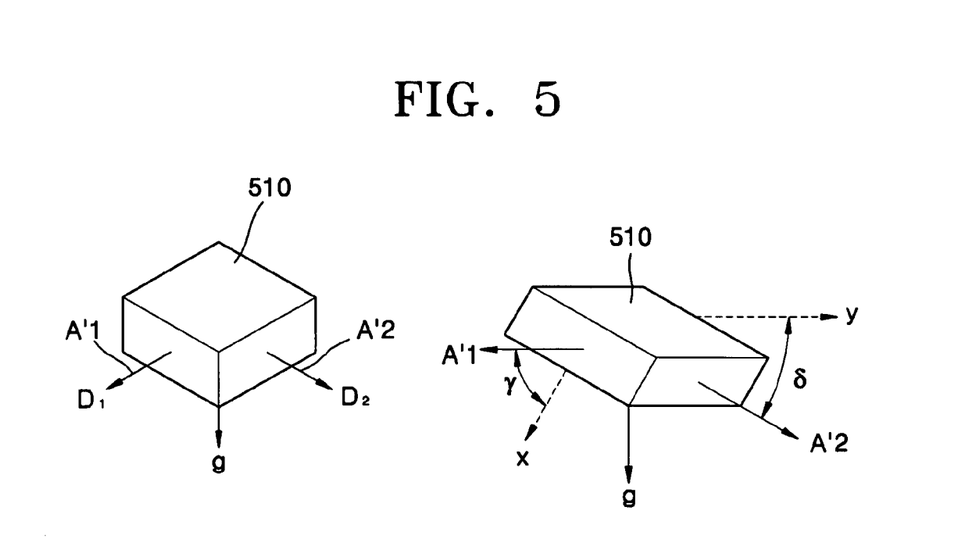
FIG. 5 is a view illustrating a principle for performing a vibration control with respect to more than one direction.

FIG. 5 shows a principle for performing a vibration control with respect to more than one direction.

In an actual moving system, the driving force applied to a single driven unit is generated at more than one driving unit. In this case, the control process described in FIGS. 2 to 4 is together performed.

Referring to FIG. 5, the driven unit moves in first and second directions D1 and D2. The first direction D1 is determined by first driving force generated from a first driving unit and the second direction D2 is determined by second driving force generated from a second driving unit. A'1 and A'2 indicate first and second measured accelerations in the first and second directions D1 and D2, respectively.

In this case, the control process described in FIG. 4 is performed with respect to the respective first and second directions D1 and D2. In a right view of FIG. 5, x and y indicate horizontal vectors corresponding to the first and second directions D1 and D2. Accordingly, γ is a horizontal difference angle of the measured acceleration A'1 with respect to the first direction D1 and δ is a horizontal difference angle of the measured acceleration A'2 with respect to the second direction D2.

Figure 6:
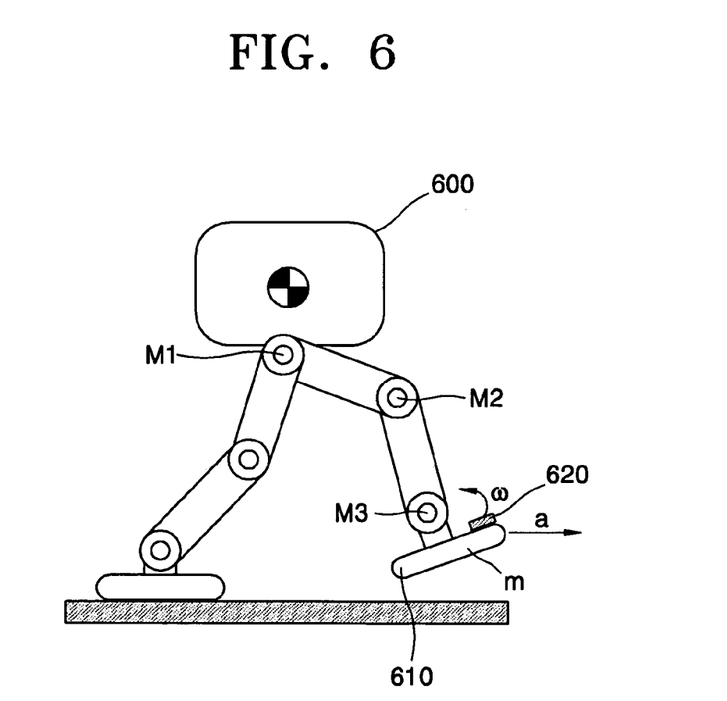
FIG. 6 is a view of a vertical multi-joint robot where a vibration control method according to the present invention is applied.

FIG. 6 shows a vertical multi-joint robot where a vibration control method according to the present invention is applied;

The robot depicted in FIG. 6 has two legs and each leg has three joints. Generally, for a multi-joint robot, a driving unit is used for each joint. Therefore, three driving units M1, M2 and M3 are used for the respective three leg joints. When it is considered that a foot is a driven unit 610, the driven unit 610 has mass m. The driven unit 610 rotates by angular acceleration w and moves in an advancing direction by a measured acceleration a. The rotation and advancing movement are affected by the first, second, and third driving units M1, M2 and M3.

When considering the vibration control with respect to the rotational motion, the moving system affecting the rotational motion is comprised of the first, second and third driving units M1, M2 and M3. Since the vibration control is performed only for the rotation motion, the first, second and third driving units can be represented as a single rotational unit Mr. In this case, the measured acceleration is "w," and the driving unit generating the control driving force is the single rotational unit Mr.

Figure 7A:
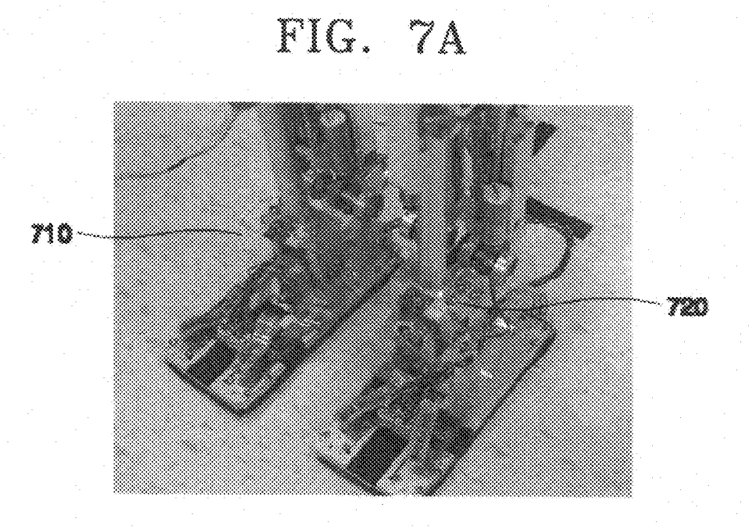
FIGS. 7A and 7B are photographical descriptions of a vertical multi-joint robot depicted in FIG. 6.
Figure 7B:
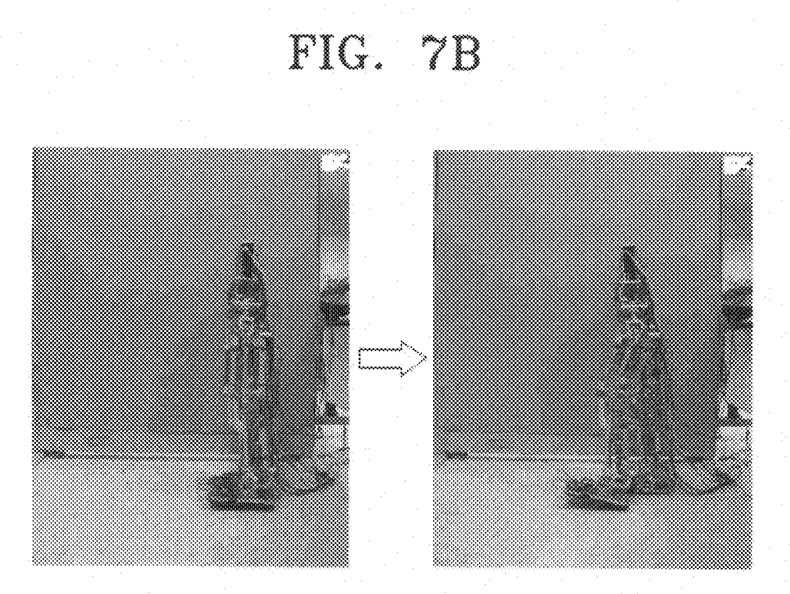

FIGS. 7A and 7B are photographical descriptions of the vertical multi-joint robot depicted in FIG. 6.

FIG. 7A shows the feet of the vertical multi-joint robot.

Referring to FIG. 7A, it can be noted that acceleration measuring sensors 710 and 720 are attached to the feet of the vertical multi-joint robot.

FIG. 7B is a photographical description of a walking motion of the vertical multi-joint robot.

Figure 8:
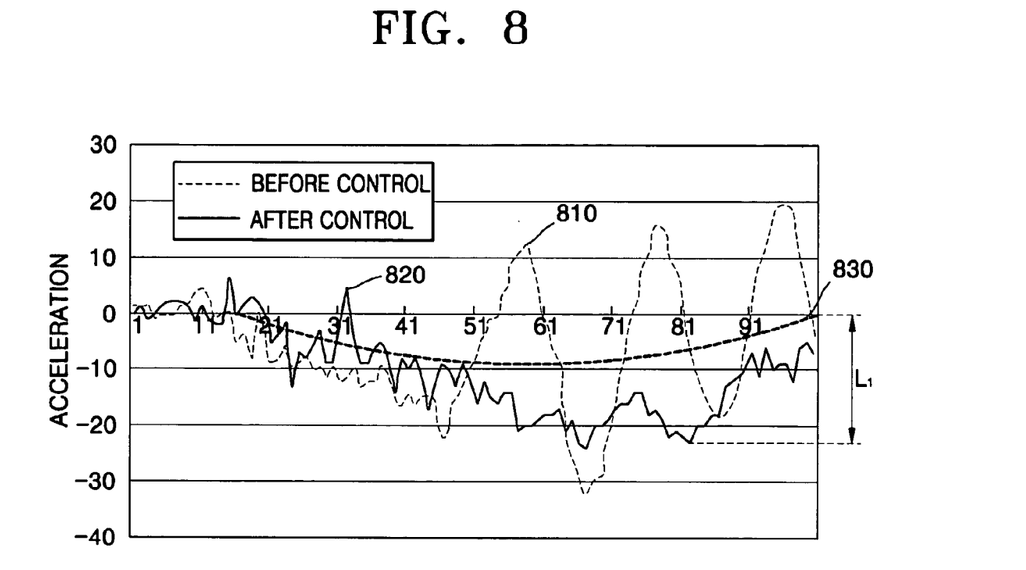
FIG. 8 is a graph illustrating a vibration control result of a vertical multi-joint robot for which a conventional vibration control method is applied.

FIG. 8 shows a graph illustrating a vibration control result of the vertical multi-joint robot for which a conventional vibration control method is applied.

A fine dotted line 810 represents measured acceleration before the vibration control is performed, and the solid line 820 represents a measured acceleration after the vibration control is preformed. A thick dotted line 830 indicates an offset of the measured acceleration before the vibration control is performed.

Referring to FIG. 8, it can be noted that the fine dotted line 810 has an offset value identical to that of the thick dotted line 830. This is resulted from not eliminating the gravity. In this case, a maximum vibration component cannot represent a nominal vibrating acceleration component as the gravity is added in between time sections 51 and 81. As a result, the determination of the vibration component to be controlled may be distorted.

In addition, although the solid line 820, particularly, between the time sections 61 and 81 represents the vibration component by the gravity, the driving signal generating unit (330 in FIG. 3 or 450 or 480 in FIG. 4) may generate an unnecessary additional control signal.

Figure 9:
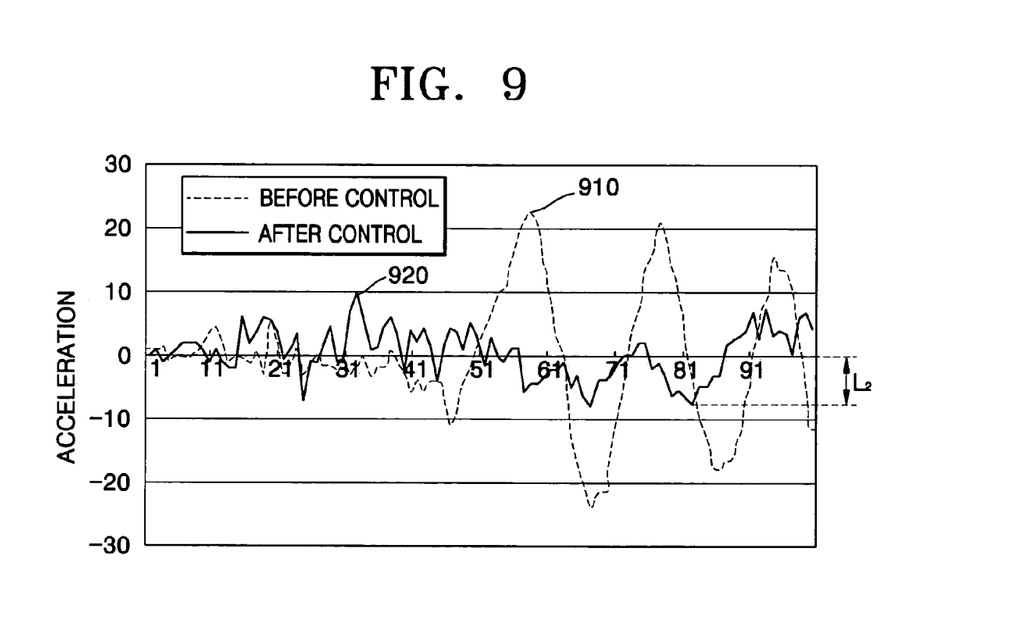
FIG. 9 is a graph illustrating a vibration control result of a vertical multi-joint robot for which a vibration control method according to the present invention is applied.

FIG. 9 shows a graph illustrating a vibration control result of a vertical multi-joint robot for which a vibration control method according to the present invention is applied. The vibration control is performed with respect to the nominal acceleration not including the gravity. A dotted line 910 represents a measured acceleration before the vibration control is performed and a solid line 920 indicates a measured acceleration after the vibration control is performed.

Referring to FIG. 9, since the nominal vibration component is extracted after a time section 51, it is easy to effectively determine specific vibration component to be controlled. Referring to the solid line 920, the values of the acceleration through whole sections are distributed in a range of 10 to −10. This means no excessive vibration is generated. Therefore, a problem of unnecessary additional control signal generation in FIG. 8 can be solved.

The above-described vibration control method can be formed in a computer program using a conventional technology. The computer program is stored in computer readable media and operated by a computer to realize the vibration control. The computer readable media can be selected from the group consisting of a magnetic recording medium, an optical recording medium, and a carrier wave medium.

According to the present invention, since the acceleration control is performed in a state where the gravity is subtracted from the measured acceleration, it becomes possible to effectively actively control the vibration.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling vibration of a moving system having driving unit and driven units, the method comprising:
    applying a driving force to a driven unit and ceasing application of the driving force to the driven unit;
    measuring an acceleration of the driven unit after the ceasing application of the driving force to the driven unit;
    generating a nominal acceleration by subtracting gravity from the measured acceleration;
    generating a control driving force based on the nominal acceleration, the driving force having a direction opposite to that of the nominal acceleration; and
    applying the control driving force to the driven unit.

2. The method of claim 1, wherein generating of the nominal acceleration comprises:
    dividing the measured acceleration into horizontal and vertical components;
    generating a nominal vertical component by subtracting the gravity from the vertical component; and
    determining the horizontal component as a nominal horizontal component.

3. The method of claim 2, wherein dividing of the measured acceleration is performed using a horizontal difference angle between the measured acceleration and a horizontal line.

4. The method of claim 3, wherein dividing of the measured acceleration is performed according to following equations, $$A'v = A' \sin \gamma$$

$$A'h = A' \cos \gamma$$

where, A' is the measured acceleration, A'v is the vertical component, A'h is the horizontal component, and $\gamma$ is the horizontal difference angle.

5. The method of claim 2, wherein generation of the nominal acceleration comprises converting a cylindrical or spherical coordinate system into a rectangular coordinate system when the measured acceleration is represented in the cylindrical or spherical coordinate system.

6. The method of claim 1, wherein generating of the control driving force comprises:
    determining if the nominal acceleration is identical to a design acceleration of the moving system; and
    generating, when the nominal acceleration is not identical to the design acceleration of the moving system, the control driving force according to the nominal acceleration and mass of the driven unit.

7. The method of claim 1, wherein generating of the control driving force comprises:
    determining if the nominal acceleration is in a predetermined range according to a desirable design acceleration of the moving system; and
    generating, when the nominal acceleration is not in the predetermined range, the control driving force according to the nominal acceleration and the mass of the driven unit.

8. The method of claim 1, wherein the moving system is a joint moving system of a robot.

9. A robot joint system controlled by the method of claim 1.

10. An apparatus for controlling vibration of a driven unit moving by a driving force, comprising:
    means for applying a driving force to a driven unit and ceasing application of the driving force to the driven unit;

an acceleration measuring unit for measuring an acceleration of the driven unit after the ceasing application of the driving force to the driven unit;

a nominal acceleration generating unit for generating a nominal acceleration by eliminating the gravity from the measured acceleration; and a driving unit for generating a control driving force according to the nominal acceleration, the control driving force having a direction opposite to that of the nominal acceleration.

11. The apparatus of claim 10, wherein the nominal acceleration generating unit generates nominal vertical components by dividing the measured acceleration into horizontal and vertical components and subtracting the gravity from the vertical component.

12. The apparatus of claim 11, wherein the nominal accelerating generating unit divides the measured acceleration into the horizontal and vertical components using a horizontal difference angle between the measured acceleration and a horizontal line.

13. The apparatus of claim 12, wherein the dividing the measured acceleration is performed according to following equations, $$A'v = A' \sin \gamma$$

$$A'h = A' \cos \gamma$$

where, $A'$ is the measured acceleration, $A'v$ is the vertical component, $A'h$ is the horizontal component, and $\gamma$ is the horizontal difference angle.

14. The apparatus of claim 11, further comprising a coordinate converting unit converting a cylindrical or spherical coordinate system into a rectangular coordinate system when the measured acceleration is represented in the cylindrical or spherical coordinate system.

15. The apparatus of claim 11, wherein the driving unit generates a driving force according to if the nominal acceleration is identical to a design acceleration of the moving system.

16. The apparatus of claim 15, wherein the driving unit generates, when the nominal acceleration is not identical to the design acceleration of the moving system, the control driving force according to the nominal acceleration and the mass of the driven unit.

17. The apparatus of claim 11, wherein the driving unit does not generate the control driving force if the nominal acceleration is in a predetermined range according to a design acceleration of the moving system.

18. The apparatus of claim 17, wherein the driving unit generates, when the nominal acceleration is not in the predetermined range, the control driving force according to the nominal acceleration and the mass of the driven unit.

19. The apparatus of claim 11, wherein the moving system is a joint moving system of a robot.

20. A joint driving system of a robot, comprising:
a driving unit generating a driving force;
a driven unit moving by the driving force;
an acceleration measuring unit measuring an acceleration of the driven unit;
after ceasing application of the driving force to the driven unit: and
a nominal acceleration generating unit generating a nominal acceleration by eliminating gravity from the measured acceleration,
wherein the driving unit generates the driving force by setting a control driving force generated according to the nominal acceleration to a design driving force.

21. A record medium storing a program for performing the method of claim 1 in a computer, wherein the program supplies operating instructions to the computer.

* * * * *